US008651930B2

(12) United States Patent
Hsu

(10) Patent No.: US 8,651,930 B2

(45) **Date of Patent: *Feb. 18, 2014**

(54) APPARATUS FOR TABLE POKER GAMES

(76) Inventor: Tien-Shu Hsu, Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/162,841

(22) Filed: Jun. 17, 2011

(65) Prior Publication Data

US 2012/0322554 A1 Dec. 20, 2012

(51) Int. Cl.
*A63F 1/00* (2006.01)
*A63F 13/00* (2006.01)

(52) U.S. Cl.
USPC .......................................... 463/13; 273/292

(58) Field of Classification Search
USPC ...................................... 463/37, 13; 273/292
See application file for complete search history.

(56) References Cited

U.S. PATENT DOCUMENTS 5,957,459 A * 9/1999 Chae ............................ 273/292
2001/0008845 A1* 7/2001 Kusuda et al. .................. 463/25
2007/0057466 A1* 3/2007 Soltys et al. ................... 273/292
2009/0176547 A1* 7/2009 Katz ............................... 463/13
2010/0171267 A1* 7/2010 Walker .......................... 273/274

* cited by examiner

*Primary Examiner* — Melba Bumgarner
*Assistant Examiner* — Anh Vo V Nguyen
(74) *Attorney, Agent, or Firm* — Muncy, Geissler, Olds & Lowe, P.C.

(57) ABSTRACT

An apparatus for table poker games aims to increase odds of the table poker games. The apparatus includes an electronic display panel which has at least one display zone to represent a corresponding betting zone and display a dynamic raising odds. Banker can pay player's bets according to the dynamic raising odds. Thus an expected value of the table poker games can be increased to give players extra award, thereby can increase the attraction of the table poker games and also enhance utilization of the poker tables.

12 Claims, 5 Drawing Sheets

| Dynamic raising odds | | | | |
|---|---|---|---|---|
| Banker's hand win | Tie | Player's hand win | Banker pair | Player pair |
| 1:1 | 1:10 | 1:1 | 1:14 | 1:11 |

40

41

411

Fig . 3

APPARATUS FOR TABLE POKER GAMES

FIELD OF THE INVENTION

The present invention relates to a table poker game and particularly to an apparatus to increase attraction of table poker games.

BACKGROUND OF THE INVENTION

A table poker game is to allow players to bet on different game results on a betting table. According to the probability of appearance of the game results on the betting table, different game results have different odds. If the game result matches a player's bet, the player gets the payment according to the odds and player's wager.

Most common table poker games, such as baccarat, have established odds according to different game results. For instance, in the game of baccarat, the probability of appearance of banker pair or player pair is 7.47%. If the odds is established at 1 to 11, return rate for the player is merely 89.6%.

As the conventional table poker games generally have a lower return rate for the players, the players would easily feel unfair about the game results after playing for a period of time and lose interest. Thus the attraction of those games to the players decreases, and the utilization of the poker tables also drops gradually to result in lower return of investment.

SUMMARY OF THE INVENTION

The primary object of the present invention is to provide an apparatus to dynamically increase odds of table poker games.

To achieve the foregoing object, the apparatus of the invention allows a banker and a player to play a table game which generates a plurality of game results. The apparatus includes a pack of poker cards, a betting table and an electronic display panel. The poker cards are used by the banker to perform the table game according to a set rule. The table game generates at least one game results, and has a game probability according to the appearance of the game result.

The betting table has a plurality of betting zones to represent different game results. The betting table can be a solid table or an electronic table containing an electronic screen. The betting zones are displayed on the electronic screen which can be a touch panel. Each of the betting zones allows players to place a bet and has a payment odds. The product of the game probability and payment odds is a player's return rate. The value of the payment odds is a given value, which is controlled so that the player's return rate is not greater than 100%.

According to different game rules, the payment odds can include bets returning to the player or bets not returning to the player. The bets returning to the player are included in the payment odds when calculating the aforesaid player's return rate, namely the payment odds equals to retrieving multiples when the player winning the bet. In another condition, if the bets returning to the player are not included in the payment odds, the retrieving multiples when the player winning the bet not only include the multiples of the payment odds, but also include the player's original bet, hence the player's return rate should be modified to the product of the sum of the payment odds and one time of the player's bet (i.e. actual retrieving multiples when the player wining the bet) and the game probability.

The electronic display panel includes at least one display zone corresponding to the betting zone, and can be mounted at one side of the betting table (a solid one), or embedded in the electronic screen of the betting table. The display zone displays a dynamic raising odds to allow the banker to choose a higher one between the payment odds and dynamic raising odds to pay the player's bet. The dynamic raising odds is any one selected from multiple raising odds. The values and numbers of the raising odds are set by the banker. Each of the raising odds has an appearing probability. The accumulation sum of the product of the raising odds and their corresponding appearing probabilities is defined as an accumulation average odds. The product of the accumulation average odds and game probability is a player's raising return rate. The raising odds and their corresponding appearing probabilities can be controlled and adjusted to let the player's raising return rate approach to a given target value.

Similarly, if the payment odds does not include the bets returning to the player, the player's raising return rate should be modified to the product of the sum of the accumulation average odds and one time of the player's bet (i.e. actual retrieving multiples when the player wining the bet) and the game probability.

By means of the apparatus set forth above, the payment odds of the game results can be replaced by the dynamic raising odds, namely when the player wins the bet, he/she can get payment according to the dynamic raising odds, hence the player's return rate increases. The dynamic raising odds is versatile and appears frequently, thus is more appealing and gives players more incentive to place the bets. As a result, utilization of the poker table increases to achieve maximum economic benefit. By controlling the player's raising return rate within an acceptable range, utilization of the poker table increases and economic benefit also can be maintained as desired.

The foregoing, as well as additional objects, features and advantages of the invention will be more readily apparent from the following detailed description, which proceeds with reference to the accompanying embodiments and drawings. The embodiments serve only for illustrative purpose and are not the limitations of the invention.

BRIEF DESCRIPTION OF THE DRAWINGS

FIG. 3 is a schematic view showing a screen of an electronic display panel of the invention.

DETAILED DESCRIPTION OF THE PREFERRED EMBODIMENTS

Figure 1:
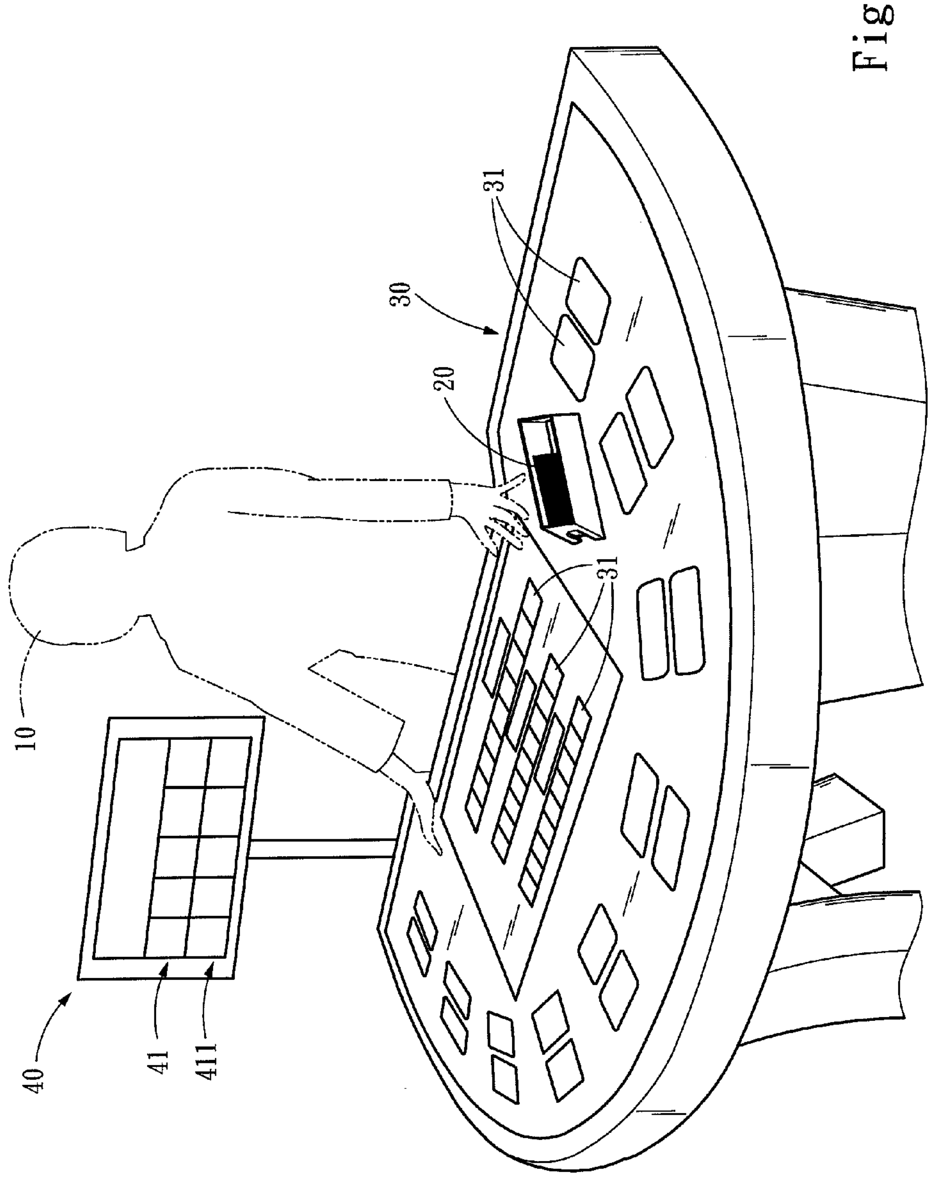
FIG. 1 is a schematic view of the structure of a solid table of the invention.
Figure 2:
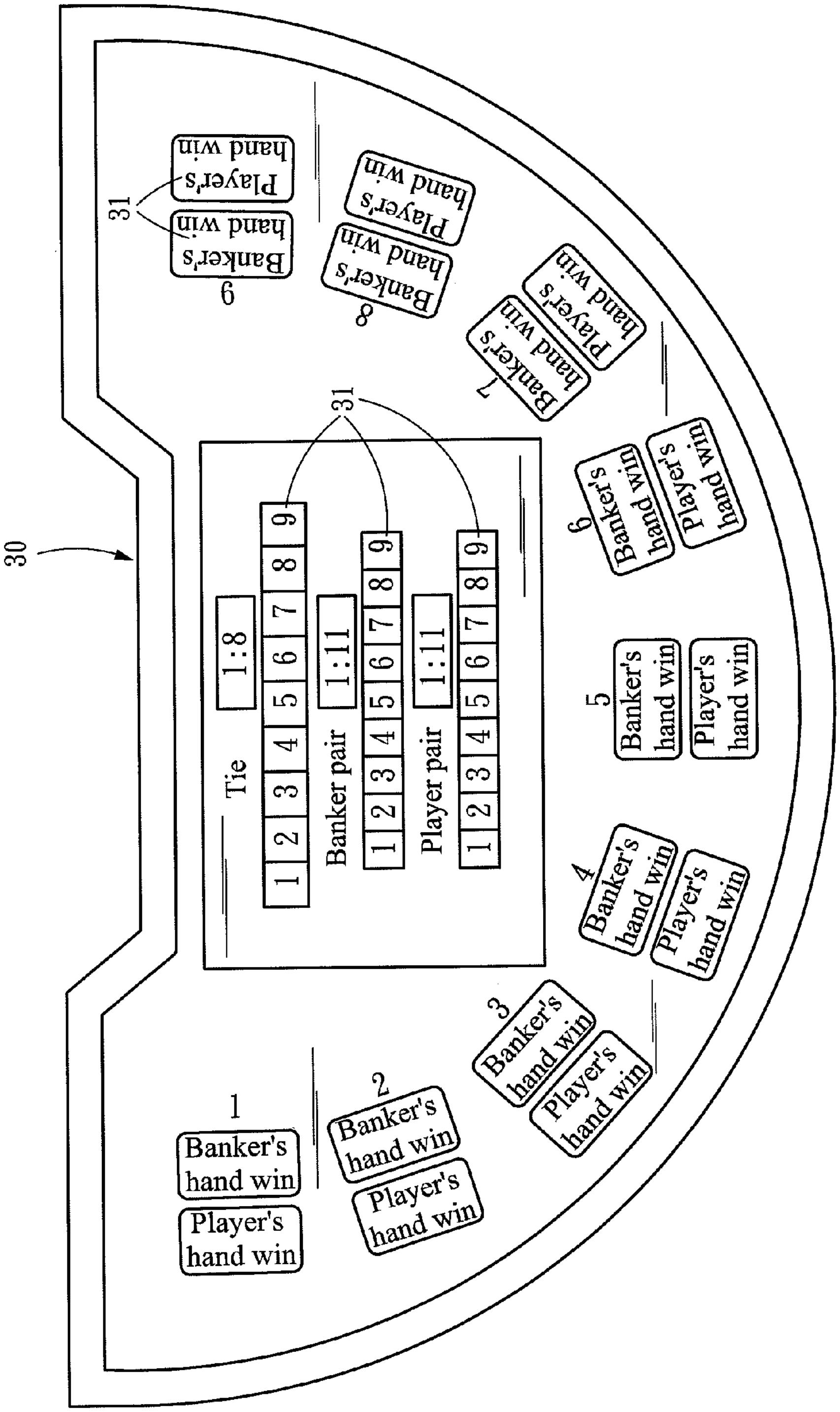
FIG. 2 is a schematic view of the betting table of a solid table of the invention.

Please refer to FIGS. 1, 2 and 3 for an embodiment of the invention, taking baccarat as an example of the table poker game for discussion.

In the baccarat game, a banker 10 and a player (not shown in the drawings) take part in the game with five possible game results: banker's hand win, tie, player's hand win, banker pair and player pair. It is to be noted that when the first two cards of the banker 10 or player are the same, the game result is banker pair or player pair. As the banker pair and player pair could appear with any one of the banker's hand win, tie and player's win at the same time, the game result of banker pair or player pair is judged independently and not related to the banker's win, tie or player's win.

This embodiment includes a pack of poker cards 20, a betting table 30 and an electronic display panel 40. The poker cards 20 are used in the baccarat game and can generate at least one of the five game results (any one of banker's hand win, tie and player's hand win plus banker pair or player pair). The probability of generating each of the five game results is defined as a game probability.

Figure 4:
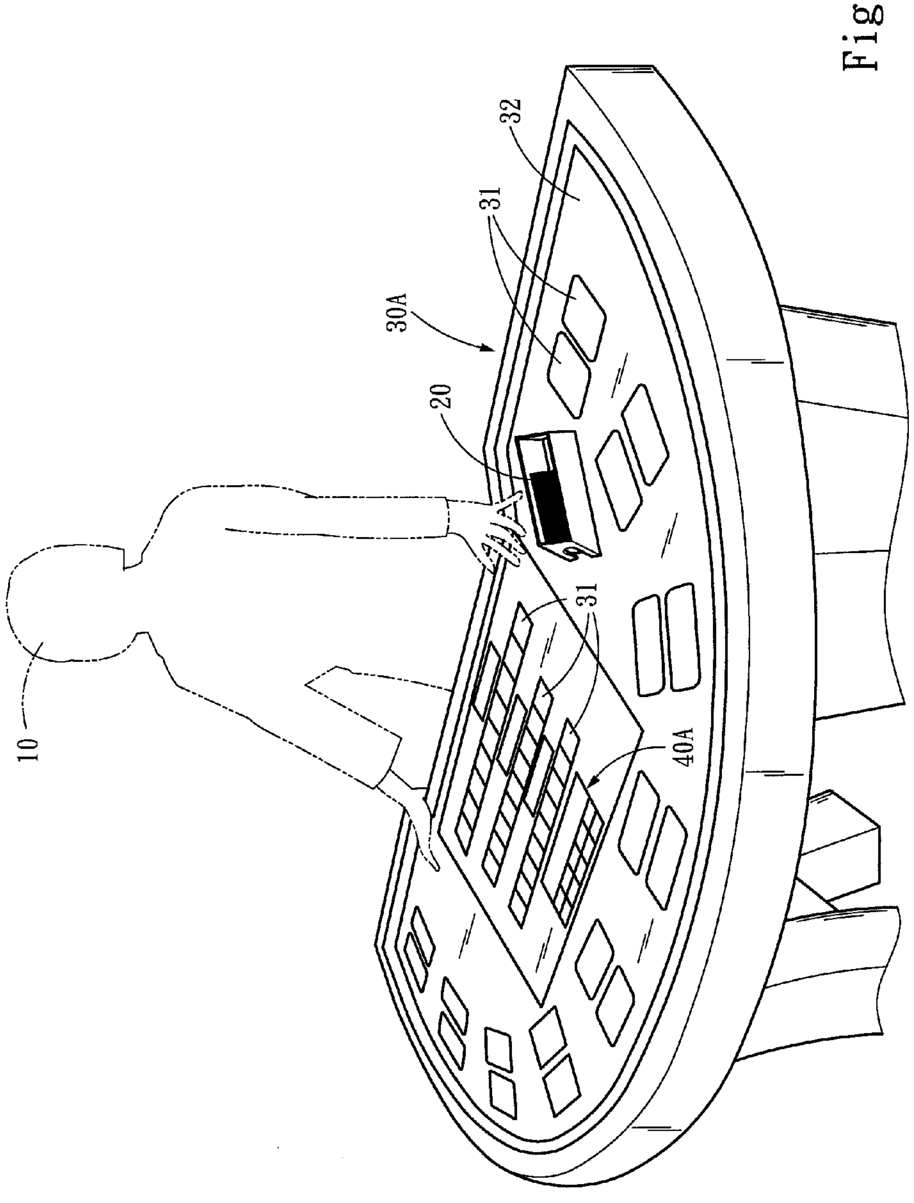
FIG. 4 is a schematic view of the structure of an electronic table of the invention.
Figure 5:
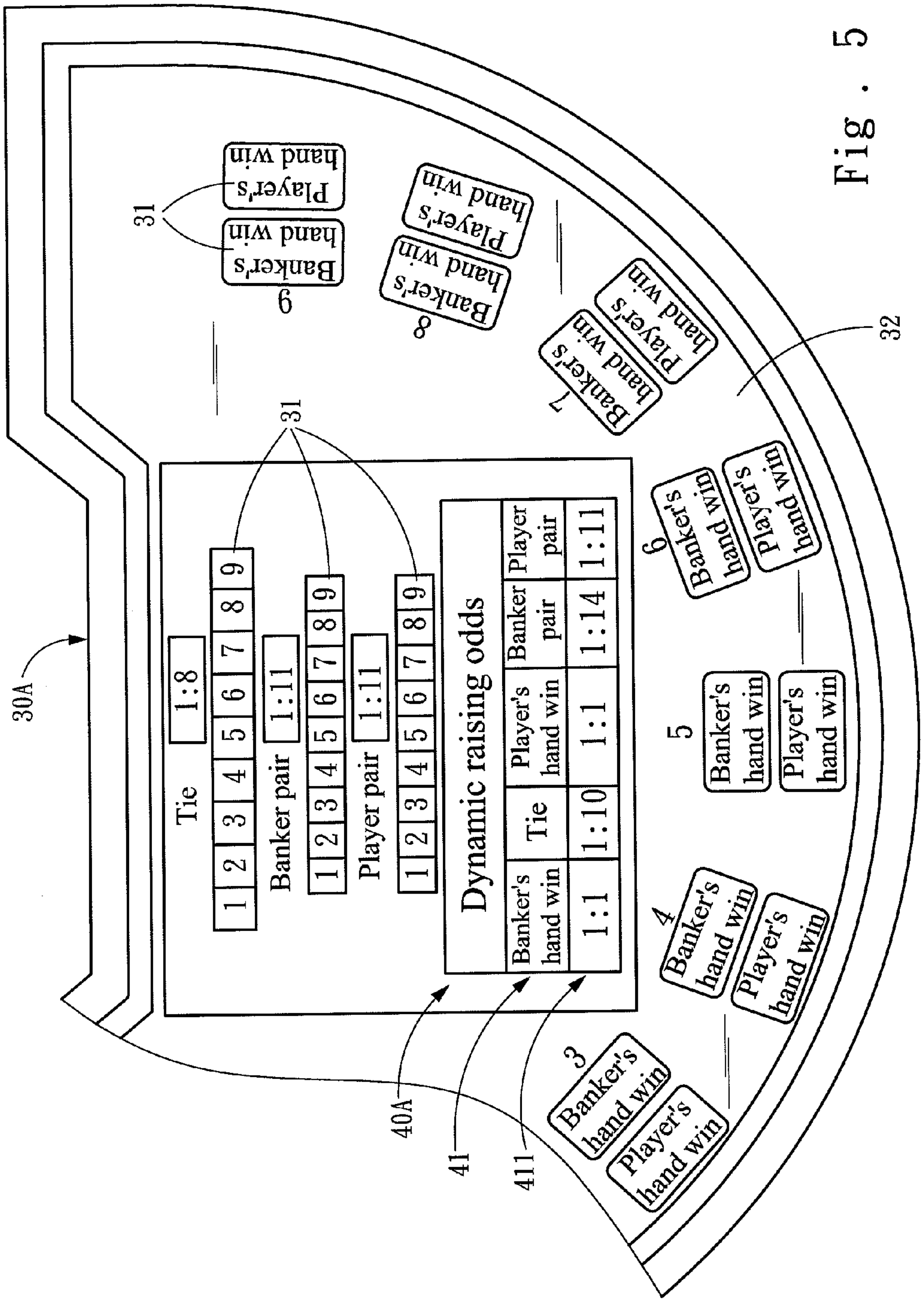
FIG. 5 is a schematic view of the betting table of an electronic table of the invention.

The betting table 30 can be implemented by at least two types. The betting table 30 can be a solid table as shown in FIG. 1 with five betting zones 31 to represent five game results. The betting table 30 is divided into nine sections (marked by 1-9) to allow nine players to place bets at the same time. The five betting zones 31 are printed and marked on the surface of the table. FIGS. 4 and 5 illustrate another type of the betting table 30A which can be an electronic table containing an electronic screen 32. The five betting zones 31 of the betting table 30A are displayed on the electronic screen 32 which can be a touch panel.

The five betting zones 31 allow the players to place bets and each has a payment odds. The product of the game probability and payment odds is a player's return rate. The payment odds is a given value which is controlled so that the player's return rate is not greater than 100%. In the event that the payment odds does not include the bets returning to the player, the player's return rate should be modified to the product of the sum of the payment odds and one time of the player's bet (i.e. actual retrieving multiples when the player winning the bet) and the game probability.

The electronic display panel 40 includes at least one display zone 41 corresponding to the betting zone 31. When the number of the betting zones 31 is not many, the electronic display panel 40 can contain sufficient display zones 41 to one-to-one correspond to the betting zones 31. In the event that a greater number of the betting zones 31 are formed, a choice can be freely made as required.

When the betting table 30 is a solid table, the electronic display panel 40 can be mounted at one side of the betting table 30 (referring to FIG. 1). When the betting table 30A is an electronic table, the electronic display panel 40A can be embedded in the electronic screen 32 of the betting table 30A (referring to FIG. 4).

The display zone 41 displays a dynamic raising odds 411 to allow the banker 10 to choose a higher one between the payment odds and dynamic raising odds 411 to pay the player's bet. The dynamic raising odds 411 is any one selected from multiple raising odds. The values and numbers of the raising odds are set by the banker 10. Each of the raising odds has an appearing probability. The accumulation sum of the product of the raising odds and their corresponding appearing probabilities is defined as an accumulation average odds. The product of the accumulation average odds and game probability is a player's raising return rate. The raising odds and their corresponding appearing probabilities can be controlled and adjusted to let the player's raising return rate approach to a given target value.

Similarly, if the dynamic raising odds 411 does not include the bets returning to the player, the player's raising return rate should be modified to the product of the sum of the accumulation average odds and one time of the player's bet (i.e. actual retrieving multiples when the player winning the bet) and game probability.

Take a game result of banker pair as an example for discussion as follows. The probability of winning the bet of banker pair is 7.47%, and the given payment odds is 1 to 11, which is the present conventional public odds. The given target value is 94% (namely store benefit is 6%, which also can be determined by itself). The number of the raising odds (not including the bets returning to the player) chose by the dynamic raising odds 411 is five with values of 1 to 11, 1 to 12, 1 to 13, 1 to 14 and 1 to 15. The appearing probabilities corresponding to the raising odds are processed and adjusted to be 62%, 25%, 8%, 3% and 2%. Incorporating the aforesaid values with the raising odds to obtain the player's raising return rate expressed as follows:

$$(1+11*62\%+12*25\%+13*8\%+14*3\%+15*2\%)*7.47\%=93.97\%$$

Thus the player's raising return rate approaches to the target value of 94% to meet requirement.

Next, take a game result of tie as an example for discussion. The probability of winning the bet of tie is 9.52%, and the given payment odds is 1 to 8. The given target value is 94%. The number of the raising odds (not including the bets returning to the player) chose by the dynamic raising odds 411 is three with values of 1 to 8, 1 to 10 and 1 to 12. The appearing probabilities corresponding to the raising odds are processed and adjusted to be 63%, 30% and 7%. Incorporating the aforesaid values with the raising odds to obtain the player's raising return rate expressed as follows:

$$(1+8*63\%+10*30\%+12*7\%)*9.52\%=94.06\%$$

Thus the player's raising return rate approaches to the target value of 94% to meet requirement.

Other game results, such as banker's hand win, player's hand win and player pair can also be adapted as previously discussed to generate different raising odds with varying appearing probabilities. For instance, due to game characteristics, if the game result is banker's hand win or player's hand win, the raising odds chose by the dynamic raising odds 411 is limited to 1 to 1; if the game result is player pair or banker pair, the number of the raising odds chose by the dynamic raising odds 411 is five with values of 1 to 11, 1 to 12, 1 to 13, 1 to 14 and 1 to 15.

Refer to FIG. 4. In this embodiment, the raising odds chose by the dynamic raising odds 411 for the game results of banker's hand win, tie, player's win, banker pair and player pair is respectively 1 to 1. 1 to 10, 1 to 1, 1 to 14 and 1 to 11. These values can be reset when each game is restarted.

As a conclusion, in the invention, the payment odds can be replaced by the dynamic raising odds 411 so that the players can get payment according to the dynamic raising odds 411 upon winning the bet, thus the player's return rate increases. Moreover, as the dynamic raising odds 411 is versatile and appears frequently, it is more appealing to the players and offers more incentive to the players to place bets. As a result, utilization of the poker table increases. Since the player's raising return rate can be controlled within an acceptable range, economic benefit of the store also can be maintained.

What is claimed is:

1. An apparatus for table poker games allowing a banker and a player to take part in a table game which generates a plurality of game results, comprising:

a pack of poker cards for the banker to perform the table game according to set rules to generate at least one of the game results to match at least one of a plurality of betting zones, each betting zone having a respective probability combined to define an overall game probability;

a betting table which includes the plurality of betting zones to represent the game results, each betting zone allowing the player to place a bet and including a payment odds to form a multiplication product by multiplying with the overall game probability to become a player's return rate which is not greater than 100% by controlling the payment odds; and an electronic display panel to display at least one display zone corresponding to the plurality of betting zones and display a plurality of dynamic raising odds;

wherein, the banker selects, via the electronic display panel, a selection of a higher one between the payment odds and one of the plurality of dynamic raising odds to pay a player's bet corresponding to one of the plurality of betting zones;

wherein, the selected one of the plurality of dynamic raising odds each including an appearing probability;

wherein, an accumulation average odds being defined as an accumulation sum of the multiplication product of the plurality of dynamic raising odds and each corresponding appearing probability;

wherein, a player's raising return rate being defined as a multiplication product of the accumulation average odds and the game overall probability;

wherein, the dynamic raising odds and each corresponding appearing probability being controlled to let the player's raising return rate approach to a given target value; and wherein, when the banker selects said one of the dynamic raised odds for the play of the poker table game, the player's return rate is adjusted to said player's raising return rate.

2. The apparatus for table poker games of claim 1, wherein the electronic display panel is mounted at one side of the betting table.

3. The apparatus for table poker games of claim 1, wherein the betting table includes an electronic screen and the plurality of betting zones are displayed on the electronic screen.

4. The apparatus for table poker games of claim 3, wherein the electronic screen comprises a touch panel.

5. The apparatus for table poker games of claim 3, wherein the electronic display panel is embedded in the electronic screen of the betting table.

6. The apparatus for table poker games of claim 1, wherein the selectable plurality of dynamic raising odds include definite values and numbers set by the banker.

7. An apparatus for table poker games allowing a banker and a player to take part in a baccarat game which includes five game results of banker's hand win, tie, player's hand win, banker pair and player pair, comprising:

a pack of poker cards for performing the baccarat game to generate at least one of the five game results, to match at least one of five betting zones, each betting zone having a respective probability combined to define an overall game probability;

a betting table which includes the five betting zones to represent the five game results, each betting zone allowing the player to place a bet and including a payment odds to form a multiplication product by multiplying with the overall game probability to become a player's return rate which is not greater than 100% by controlling the payment odds; and an electronic display panel to display at least one display zone corresponding to the five betting zones and display a plurality of dynamic raising odds;

wherein, the banker selects, via the electronic display panel, a selection of a higher one between the payment odds and one of the plurality of dynamic raising odds to pay a player's bet corresponding to one of the five betting zones;

wherein, the selected one of the plurality of dynamic raising odds each including an appearing probability;

wherein, an accumulation average odds being defined as an accumulation sum of the multiplication product of the plurality of dynamic raising odds and each corresponding appearing probability;

wherein, a player's raising return rate being defined as a multiplication product of the accumulation average odds and the game overall probability;

wherein, the dynamic raising odds and each corresponding appearing probability being controlled to let the player's raising return rate approach to a given target value; and wherein, when the banker selects said one of the dynamic raised odds for the play of the poker table game, the player's return rate is adjusted to said player's raising return rate.

8. The apparatus for table poker games of claim 7, wherein the electronic display panel is mounted at one side of the betting table.

9. The apparatus for table poker games of claim 7, wherein the betting table includes an electronic screen and the five betting zones thereof are displayed on the electronic screen.

10. The apparatus for table poker games of claim 9, wherein the electronic screen comprises a touch panel.

11. The apparatus for table poker games of claim 9, wherein the electronic display panel is embedded in the electronic screen of the betting table.

12. The apparatus for table poker games of claim 7, wherein the selectable plurality of dynamic raising odds include definite values and numbers set by the banker.

* * * * *